United States Patent [19]

Kodama et al.

[11] Patent Number: 5,208,752
[45] Date of Patent: May 4, 1993

[54] CONTROL APPARATUS FOR POWER-ASSISTED STEERING SYSTEM

[75] Inventors: Kazumasa Kodama, Okazaki; Kunihiko Eto, Toyota; Hisashi Koba; Yuzo Kubota, both of Susono; Kimio Yamaguchi, Gotenba, all of Japan

[73] Assignee: Toyoda Koki Kabushiki Kaisha, Kariya, Japan

[21] Appl. No.: 620,003

[22] Filed: Nov. 30, 1990

[30] Foreign Application Priority Data

Dec. 1, 1989 [JP]  Japan .................................. 1-313950

[51] Int. Cl.⁵ ............................................. B62D 6/02
[52] U.S. Cl. ............................... 364/424.05; 180/79.1; 180/142
[58] Field of Search ................... 364/424.05; 180/79.1, 180/140, 141, 142, 143

[56] References Cited

U.S. PATENT DOCUMENTS

| | | | |
|---|---|---|---|
| 4,476,529 | 10/1984 | Nakamura et al. | 180/142 |
| 4,745,985 | 5/1988 | Nakayama et al. | 180/142 |
| 4,979,114 | 12/1990 | Oshita et al. | 180/79.1 |

FOREIGN PATENT DOCUMENTS

2188890  10/1987  United Kingdom .

OTHER PUBLICATIONS

Patent Abstracts of Japan, vol. 013, No. 153 (M-813) Apr. 13, 1989, Publication No.: 63 312268 "Steering Wheel Return Control Device For Power Steering Apparatus".

Patent Abstracts of Japan, vol. 012, No. 160 (M-697) May 14, 1988, Publication No.: 62 279170 "Steering Force Control Device For Power Steering Device".

*Primary Examiner*—Gary Chin
*Attorney, Agent, or Firm*—Oblon, Spivak, McClelland, Maier & Neustadt

[57] ABSTRACT

A control apparatus for a power-assisted steering system which includes a servo valve associated with a hydraulic power cylinder to selectively direct the flow of fluid under pressure from a source of hydraulic pressure to opposite fluid chambers of the power cylinder in response to operation of a steering wheel and an electrically operated control valve arranged to control hydraulic pressure for power assist applied to the servo valve in accordance with a control current applied thereto. The control apparatus is arranged to control the value of the control current in such a manner that the hydraulic pressure for power assist is decreased when the steering wheel is returned to its neutral position from its steered position during low speed travel of the vehicle and that the hydraulic pressure for power assist is increased when the steering wheel is returned to its neutral position from its steered position during high speed travel of the vehicle.

4 Claims, 6 Drawing Sheets

CONTROL APPARATUS FOR POWER-ASSISTED STEERING SYSTEM

BACKGROUND OF THE INVENTION

1. Field of the Invention

The present invention relates to a power-assisted steering system for use in wheeled vehicles, and more particularly to a control apparatus for the power-assisted steering system of the type which includes an electrically operated control mechanism associated with a servo valve to vary a steering characteristic between input and output shafts of the servo valve in accordance with a control current applied thereto.

2. Description of the Prior Art

In such a conventional control apparatus as described above, the control current is applied to the electrically operated control mechanism to control a power assist to the driver's steering effort in accordance with a travel speed of the vehicle. Under such control, satisfactory results are obtainable in the turning characteristic of the steering wheel but unobtainable in the return characteristic of the steering wheel. Disclosed in Japanese Patent Early Publication No. 62-279170 is a control apparatus for a power-assisted steering system which comprises a servo valve arranged to be operated by relative rotation of input and output shafts for controlling the supply of fluid under pressure to a hydraulic power cylinder, a hydraulic reaction mechanism associated with the servo valve to apply a reaction force to the input shaft in accordance with fluid under pressure applied thereto so as to facilitate return movement of the steering wheel to its neutral position, a first sensor for detecting a steering angle of the steering wheel, a second sensor for detecting approach of the steering angle to the neutral position, and means for increasing the supply quantity of fluid under pressure to the reaction mechanism in response to an output signal of the second sensor. In this control apparatus, however, the supply quantity of fluid under pressure to the reaction mechanism is increased irrespectively of a travel speed of the vehicle. For this reason, if it is intended to facilitate return movement of the steering wheel during low speed travel of the vehicle, the steering wheel will be rapidly returned to its neutral position during high speed travel of the vehicle, resulting in deterioration of the driver's operational feel.

SUMMARY OF THE INVENTION

It is, therefore, a primary object of the present invention to provide an improved control apparatus for the power-assisted steering system wherein the supply quantity of fluid under pressure to the reaction mechanism is controlled in accordance with a travel speed of the vehicle to facilitate return movement of the steering wheel during low speed travel of the vehicle without causing deterioration of the driver's operational feel during high speed travel of the vehicle.

According to the present invention, the primary object is accomplished by providing a control apparatus for a power assisted steering system which includes an input shaft operatively connected to a steering wheel, an output shaft arranged for relative rotation with the input shaft, a hydraulic power cylinder operatively connected to the output shaft and having opposite fluid chambers subdivided by a power piston mounted therein for reciprocating movement, a servo valve arranged to be operated by relative rotation of the input and output shafts for selectively directing the flow of fluid under pressure from a source of hydraulic pressure to one of the fluid chambers of the power cylinder and permitting the flow of fluid discharged from the other of the fluid chambers into a fluid reservoir, and an electrically operated control valve arranged to control hydraulic pressure for power assist applied to the servo valve in accordance with a control current applied thereto. The control apparatus comprises a first sensor for detecting a steering angle of the steering wheel and for producing a first output signal indicative of the steering angle, a second sensor for detecting a travel speed of the vehicle and for producing a second output signal indicative of the vehicle travel speed, means responsive to the first output signal from the first sensor for determining as to whether or not the steering wheel is returned to its neutral position from its steered position, and means responsive to the second output signal from the second sensor for controlling the value of the control current on a basis of the determination in such a manner that the hydraulic pressure for power assist is decreased when the steering wheel is returned during low speed travel of the vehicle and that the hydraulic pressure for power assist is increased when the steering wheel is returned during high speed travel of the vehicle.

BRIEF DESCRIPTION OF THE DRAWINGS

Other objects, features and advantages of the present invention will become more readily apparent from the following detailed description of a preferred embodiment thereof when taken together with the accompanying drawings, in which:

FIG. 3 (b) is a graph showing a relationship between manual torque and hydraulic pressure for power assist during high speed travel of the vehicle;

FIG. 5 (b) is a graph showing a relationship between a steering angle and a base current;

FIG. 6 (b) is a graph showing a relationship between a travel speed of the vehicle and a second correction current;

FIG. 7 (b) is a graph showing a relationship between a steering angle and a second correction coefficient.

DESCRIPTION OF THE PREFERRED EMBODIMENT

Figure 1:
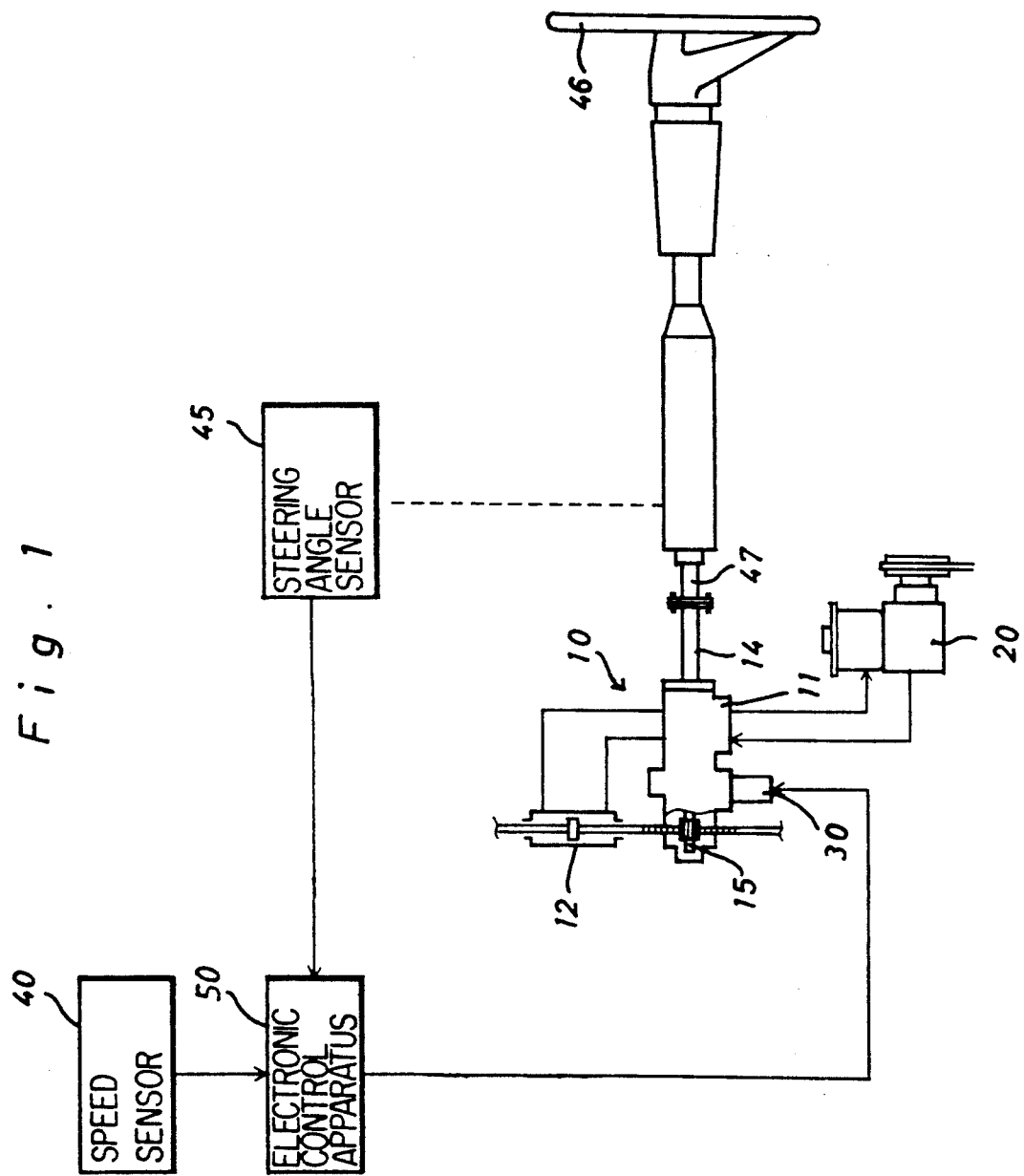
FIG. 1 is a schematic block diagram of an electric control apparatus for a power-assisted steering system.
Figure 2:
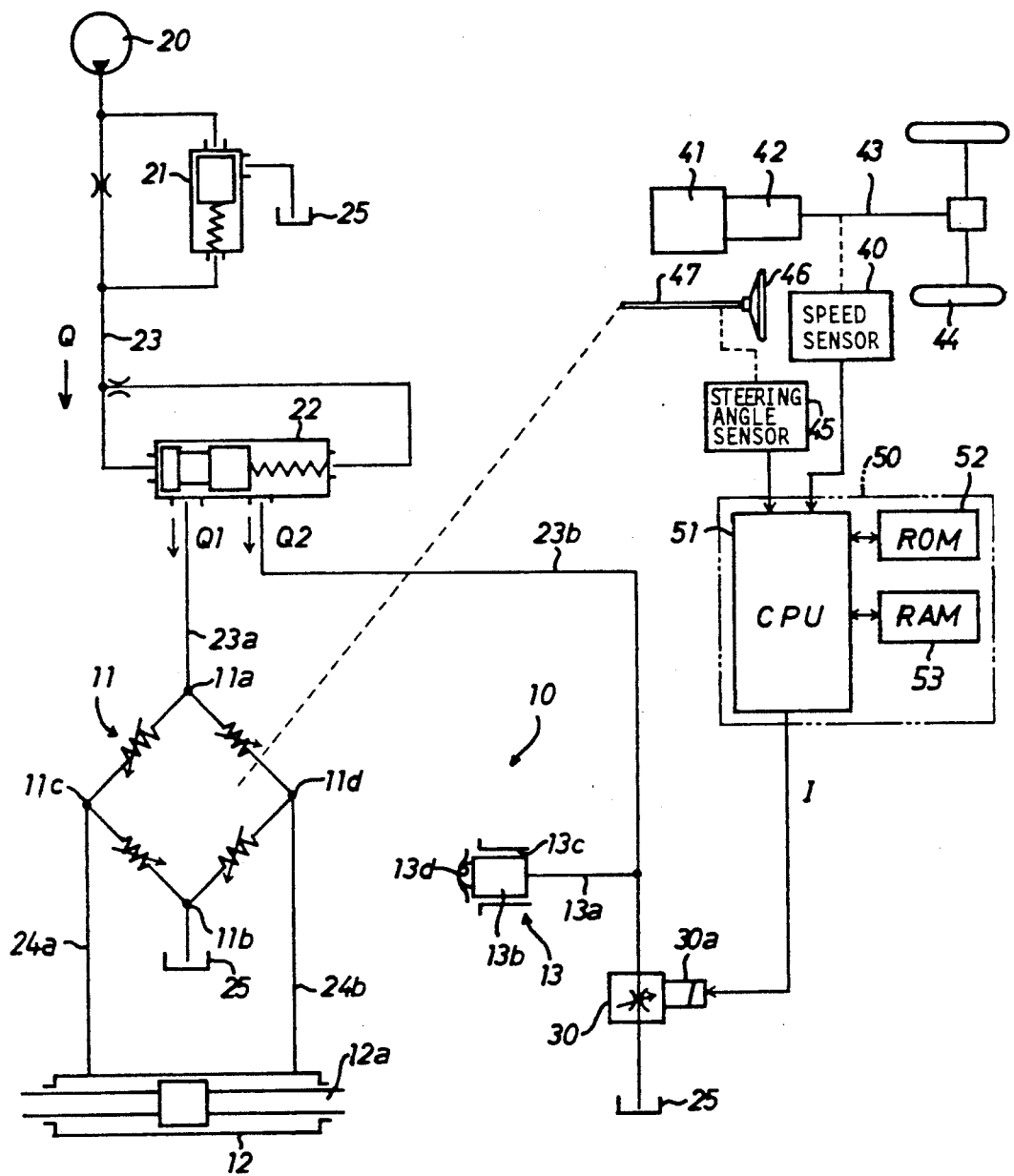
FIG. 2 is a schematic illustration of the power-assisted steering system.

In FIGS. 1 and 2 of the drawings, there is schematically illustrated a power-assisted steering system 10 in a wheeled vehicle which comprises a servo valve 11 arranged to be operated by relative rotation of input and output shafts 14 and 15, a hydraulic power cylinder 12 operatively connected to the output shaft 15 by means of a rack-and-pinion mechanism and a source of hydraulic pressure in the form of a fluid pump 20 driven by a prime mover of the vehicle. The input shaft 14 is operatively connected to a steering shaft 47 to be rotated by the driver's steering effort applied to a steering wheel 46. The power cylinder 12 includes therein a power piston mounted for reciprocating movement and connected to an operation rod 12a which is operatively connected to a set of pneumatic road wheels (not shown) by way of a steering linkage (not shown).

As shown in FIG. 2, the fluid pump 20 is provided with a bypass valve 21 which cooperates with a throttle 21a in a delivery passage 23 to supply fluid under pressure discharged from pump 20 to a flow dividing valve 22 at a predetermined quantity. The flow dividing valve 22 is arranged to distribute the fluid under pressure to a servo valve passage 23a and a reaction control passage 23b respectively at quantity $Q_1$ and $Q_2$. The servo valve passage 23a is connected to the power cylinder 12 through the servo valve 11, while the reaction control passage 23b is connected to a hydraulic reaction mechanism 13 and an electrically operated control valve 30. In the case that the fluid pump 20 is driven by an electric motor, the bypass valve 21 is not required.

The servo valve 11 is in the form of a rotary type changeover valve which is responsive to relative rotation of input and output shafts 14 and 15 to selectively direct the flow of fluid under pressure from the servo valve passage 23a to opposite fluid chambers of the power cylinder 12 thereby to effect reciprocating movement of the power piston. The servo valve 11 has an inlet port 11a connected to the servo valve passage 23a, an exhaust port 11b connected to a fluid reservoir 25, and distribution ports 11c, 11d connected to the opposite fluid chambers of power cylinder 12. In a condition where the steering wheel 46 is retained in a neutral position, the pressure of hydraulic fluid supplied into the inlet port 11a from pump 20 is maintained at a low level, and both the distribution ports 11c, 11d are applied with the low pressure to maintain the power cylinder 12 inoperative. When the steering wheel 46 is turned in one direction, fluid passages between the inlet port 11a and one of the distribution ports 11c or 11d and between the exhaust port 11b and the other distribution port 11d or 11c are throttled to increase the hydraulic pressure for power assist at the inlet port 11a. As a result, the hydraulic fluid under pressure is supplied into one of the fluid chambers of power cylinder 12 through the distribution port 11d or 11c and one of distribution passages 24b or 24a, while the hydraulic fluid in the other fluid chamber of power cylinder 12 is discharged into the fluid reservoir 25 through the other distribution passage 24a or 24b and port 11c or 11d. Thus, the resulting pressure differential across the power piston provides a hydraulic power assist to the driver's steering effort applied to the steering wheel 46 during turning maneuver of the vehicle.

The hydraulic reaction mechanism 13 includes a plunger 13b movable in a radial bore 13c formed in the output shaft 15 and being engaged at its inner end with a v-groove 13d axially formed on the input shaft 14. The plunger 13b is applied at its outer end with the fluid under pressure from a port 13a under control of the electrically operated control valve 30 to vary a torsional characteristic of the output shaft 15 relative to the input shaft 14. Thus, the operation characteristic of servo valve 11 is varied under control of the hydraulic reaction mechanism 13. The electrically operated control valve 30 is arranged to be fully closed in its deactivated condition and to be opened in accordance with increase of a control current I applied to its solenoid winding 30a under control of an electronic control apparatus 50.

As shown in FIG. 2, the electronic control apparatus 50 comprises a microcomputer including a central processing unit or CPU 51, a read-only memory or ROM 52 and a random access memory or RAM 53. The CPU 51 is connected to a speed sensor 40 and a steering angle sensor 45 through an input interface (not shown) and is connected through an output interface and a driving circuit (not shown) to the solenoid winding 30a of control valve 30. The speed sensor 40 is mounted on an output shaft 43 of a power transmission 42 mounted to the prime mover 41 of the vehicle to produce an output signal indicative of the vehicle speed v. The steering angle sensor 45 is mounted on the steering shaft 47 to produce an output signal indicative of a steering angle $\theta$ of the steering wheel 46. The ROM 52 is arranged to memorize characteristics of the control current I in relation to the steering angle $\theta$ and vehicle speed v. The characteristics of the control current I are memorized in the form of maps shown in FIGS. 5 (a) to 7 (b) where defined are characteristics of a base current $I_o$, first and second correction currents $i_1$, $i_2$, and first and second correction coefficients $k_1$, $k_2$.

Figure 5A:
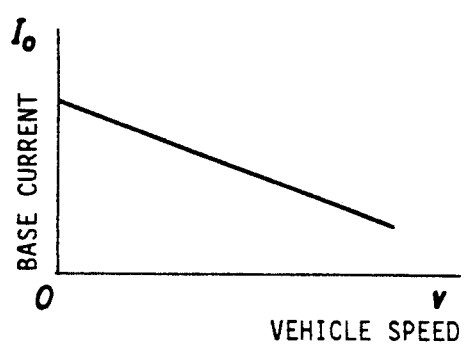
FIG. 5 (a) is a graph showing a relationship between a travel speed of the vehicle and a base current.
Figure 5B:
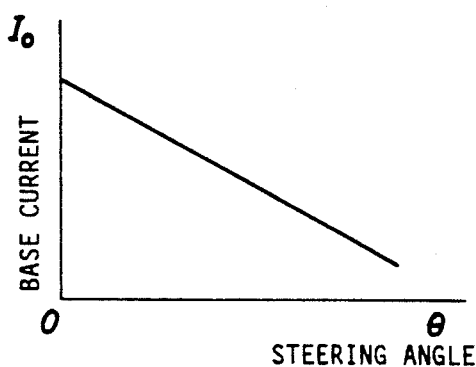
Figure 8:
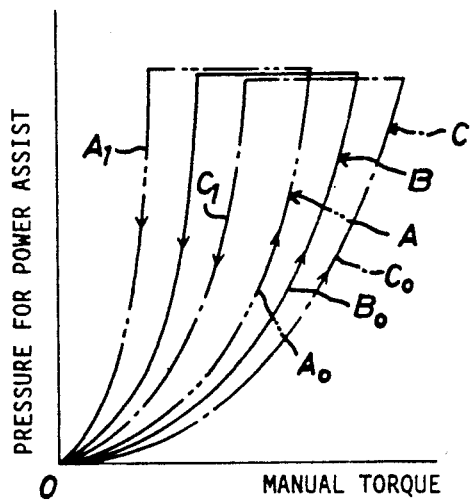
FIG. 8 is a graph showing a relationship between manual torque and hydraulic pressure for power assist.

As shown in FIGS. 5 (a) and (b), the base current $I_o$ is defined to be linearly decreased in accordance with increase of absolute values of the vehicle speed v and steering angle $\theta$. In the case that only the base current $I_o$ is applied to the solenoid winding 30a of control valve 30, the hydraulic pressure for power assist is controlled in accordance with manual torque applied to the steering wheel 46 as shown by hysteresis characteristic curves A, B, C in FIG. 8. Assuming that the travel speed of the vehicle is increased from a low speed to a high speed, the effective hysteresis characteristic curve will be changed from A to C. Thus, the hydraulic pressure for power assist in relation to the manual torque will decrease in accordance with increase of the vehicle speed during turning and return movements of the steering wheel. This means that return movement of the steering wheel caused by a restorative force of the road wheel tires is deteriorated during low speed travel of the vehicle since the hydraulic pressure for power assist is increased as shown by a return portion $A_1$ of the hysteresis characteristic curve A in FIG. 8.

Figure 6A:
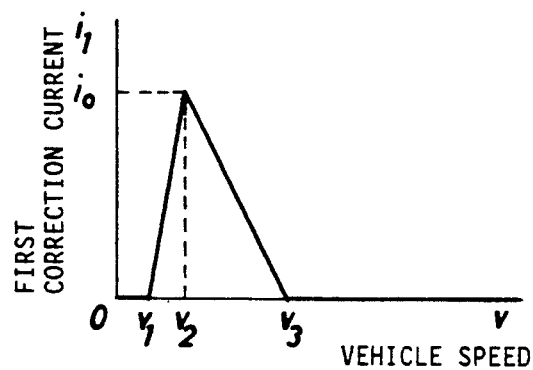
FIG. 6 (a) is a graph showing a relationship between a travel speed of the vehicle and a first correction current.
Figure 6B:
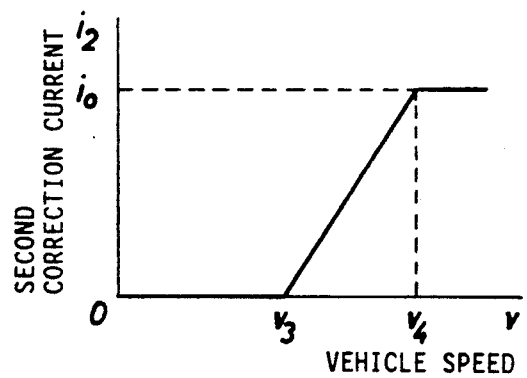
Figure 7A:
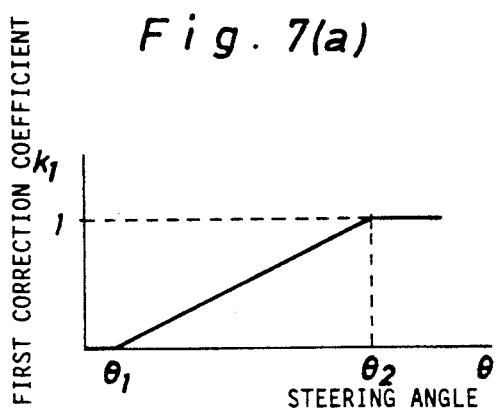
FIG. 7 (a) is a graph showing relationship between a steering angle and a first correction coefficient.
Figure 7B:
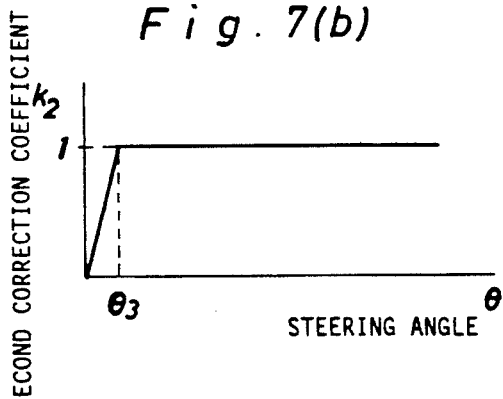

As shown in FIG. 6 (a), the first correction current $i_1$ is defined to be maintained at zero until the vehicle speed increases up to $v_1$ and to be increased in accordance with increase of the vehicle speed from $v_1$ to $v_2$ and decreased in accordance with further increase of the vehicle speed from $v_2$ to $v_3$. When the vehicle speed is increased over $v_3$, the first correction current $i_1$ is maintained at the zero value. As shown in FIG. 6 (b), the second correction current $i_2$ is defined to be maintained at zero until the vehicle speed increases up to $v_3$ and to be increased in accordance with increase of the vehicle speed from $v_3$ to $v_4$ and maintained at a constant value $i_o$ when the vehicle speed is increased over $v_4$. As shown in FIG. 7 (a), the first correction coefficient $k_1$ is defined to be maintained as a zero value until the steering angle $\theta$ is increased to $\theta_1$ and to be increased up to "1" in accordance with increase of the steering angle $\theta$ from $\theta_1$ to $\theta_2$ and maintained as "1" when the steering angle is increased over $\theta_2$. As shown in FIG. 7 (b), the second correction coefficient $k_2$ is defined to be increased up to "1" in accordance with increase of the steering angle $\theta$ from zero to $\theta_3$ and to be maintained as "1" when the steering angle $\theta$ is increased over $\theta_3$. Although in this embodiment the foregoing characteristics have been memorized in the form of maps, these characteristics may be memorized in form of an experiment formula or a function formula.

The ROM 52 is arranged to memorize a first control program for setting a flag $F_1$ as "1" when a steering angular speed calculated on a basis of the steering angle $\theta$ is negative or the steering wheel is returned from its steered position to its neutral position and to memorize a second control program for setting a flag $F_2$ as "1" when an acceleration calculated on a basis of the vehicle speed v is positive. The ROM 52 is arranged to further memorize a current control program for calculating the base current $I_o$, first and second correction currents $i_1$, $i_2$, and first and second correction coefficients $k_1$, $k_2$ on a basis of the detected vehicle speed v and steering angle $\theta$, for applying a control current of $I = I_o$ to the solenoid winding 30a of control valve 30 when the flag $F_1$ is not set as "1", for applying a control current of $I = I_o - i_1 \times k_1 + i_2 \times k_2$ to the solenoid winding 30a of control valve 30 when the flags $F_1$ and $F_2$ each are set as "1", and for applying a control current of $I = I_o + i_2 \times k_2$ to the solenoid winding 30a of control valve 30 when the flag $F_2$ is not set as "1" in a condition where the flag $F_1$ is set as "1".

Figure 4:
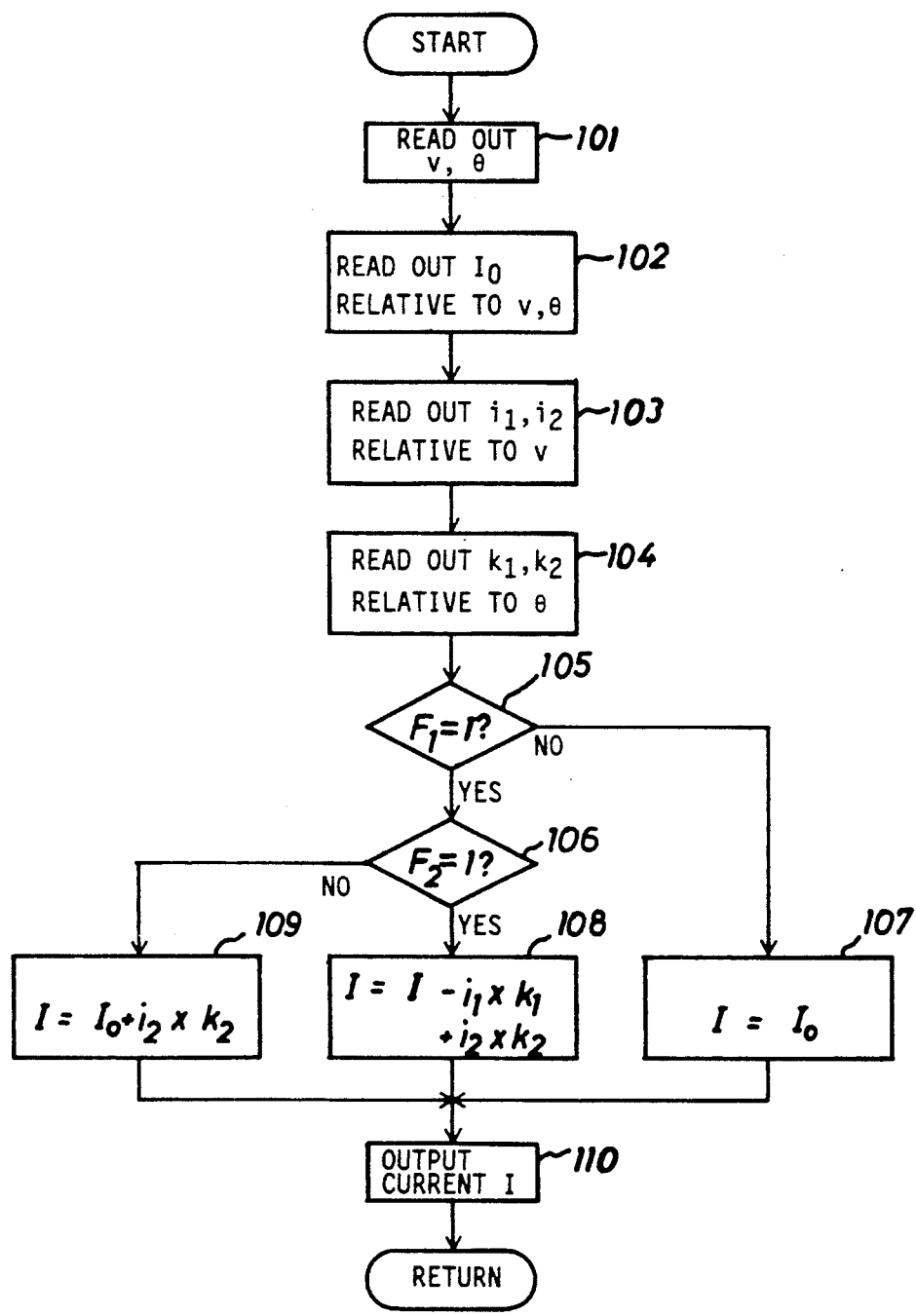
FIG. 4 is a flow chart for control of a control current applied to an electrically operated control valve shown in FIG. 2.

Hereinafter, the operation of the power-assisted steering system will be described with reference to the flow chart of FIG. 4. Assuming that a main switch of the vehicle is closed to activate the electronic control apparatus 50, variables for execution of the current control program are initialized. During travel of the vehicle, the vehicle speed v and steering angle $\theta$ are detected by sensors 40 and 45 and temporarily memorized in the RAM 53. The CPU 51 acts to set the flags $F_1$ and $F_2$ on a basis of the first and second control programs memorized in the ROM 52 and to execute the current control program represented by the flow chart in FIG. 4 when applied with an interruption signal at a predetermined time interval of, for instance, 0.5 second. When the current control program proceeds to step 101, the vehicle speed v and steering angle $\theta$ are read out from the RAM 53 and memorized in an internal register of the CPU 51. At the following steps 102, 103 and 104, the CPU 51 reads out a base current $I_o$ in relation to the vehicle speed v and steering angle $\theta$ from the maps of FIGS. 5 (a) and (b), first and second correction currents $i_1$, $i_2$ in relation to the vehicle speed v from the maps of FIGS. 6 (a) and (b), and first and second correction coefficients $k_1$, $k_2$ in relation to the steering angle $\theta$ from the maps of FIGS. 7 (a) and (b).

When the current control program proceeds to step 105, the CPU 51 determines whether the flag $F_1$ is set as "1" or not. In this instance, the CPU 51 determines a "No" answer at step 105 when the steering wheel is steered to turn the vehicle and determines a "Yes" answer at step 105 when the steering wheel is returned to its neutral position. If the answer at step 105 is "No", the CPU 51 causes the program to proceed to step 107. In turn, the CPU 51 calculates a control current I defined by the base current $I_o$ at step 107 and applies the calculated control current I to the solenoid winding 30a of control valve 30 at step 110. Thus, the hydraulic pressure for power assist during turning movement of the steering wheel is controlled as shown by the characteristic curves $A_o$, $B_o$, $C_o$ respectively at low, medium and high speeds.

Figure 3A:
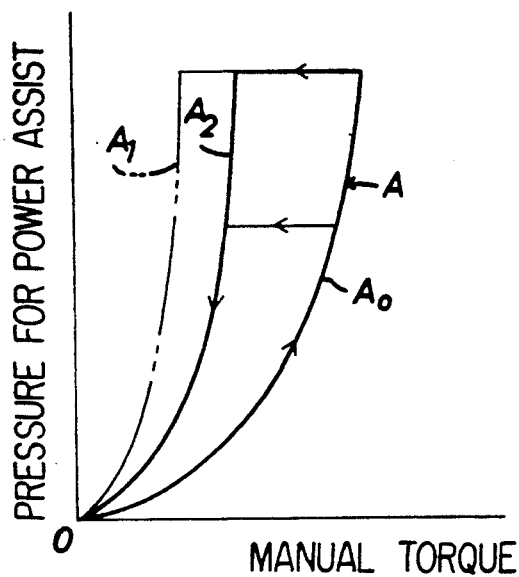
FIG. 3 (a) is a graph showing a relationship between manual torque and hydraulic pressure for power assist during low speed travel of the vehicle.
Figure 3B:
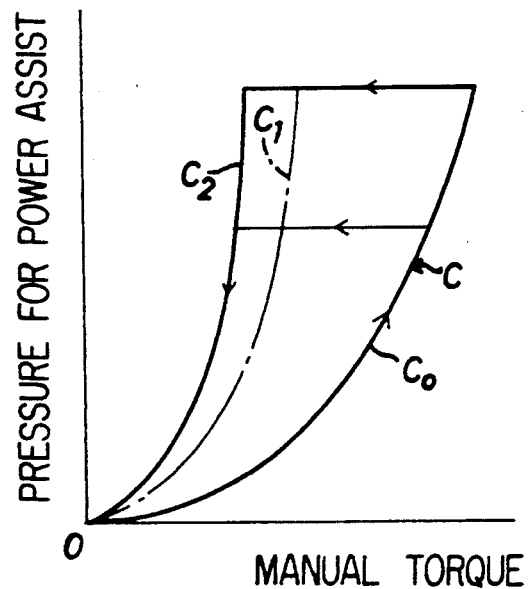

If the answer at step 105 is "Yes", the CPU 51 causes the program to proceed to step 106. In turn, the CPU 51 determines whether the flag $F_2$ is set as "1" or nor. When the vehicle is being accelerated, the flag $F_2$ is set as "1". Thus, the CPU 51 determines a "Yes" answer at step 106 and causes the program to proceed to step 108. In turn, the CPU 51 calculates a control current I defined by the equation $I = I_o - i_1 \times k_1 + i_2 \times k_2$ and applies the calculated control current I at step 110 to the solenoid winding 30a of control valve 30. In this instance, the control current I is calculated to be smaller at a low speed and larger at a high speed than that in turning movement of the steering Wheel. Thus, the opening degree of control valve 30 is controlled to be smaller at the low speed and larger at the high speed than that in turning movement of the steering wheel. As a result, the hydraulic pressure for power assist is decreased in return movement of the steering wheel at the low speed as shown by a characteristic curve $A_2$ in FIG. 3 (a). This is effective to facilitate return movement of the steering wheel to its neutral position. In return movement of the steering wheel at the high speed, the hydraulic pressure for power assist is increased as shown by a characteristic curve $C_2$ in FIG. 3 (b). This is effective to ensure reliable return movement of the steering wheel during the high speed travel of the vehicle.

During travel of the vehicle without any acceleration, the CPU 51 determines a "No" answer at step 106 and causes the program to proceed to step 109. In turn, the CPU 51 calculates a control current I defined by the equation $I = I_o + i_2 \times k_2$ and applies the calculated control current I at step 110 to the solenoid winding 30a of control valve 30. In this instance, the hydraulic pressure for power assist is calculated as shown by a characteristic curve $A_1$ in FIG. 3 (a) during return movement of the steering wheel at a lower speed than $v_3$ and is calculated as shown by a characteristic curve $C_2$ during return movement of the steering wheel at a higher speed than $v_3$.

After processing at step 110, the CPU 51 will repeat the execution of the current control program in response to the interruption signal applied thereto at the predetermined time interval. Thus, the opening degree of control valve 30 is controlled in a usual manner during turning movement of the steering wheel and is controlled in accordance with the vehicle speed during return movement of the steering wheel to facilitate return movement of the steering wheel at a low speed travel of the vehicle and to ensure reliable return movement of the steering wheel during high speed travel of the vehicle.

Although in the above-described embodiment the present invention has been adapted to control a hydraulic reaction mechanism in a power-assisted steering system, the present invention may be adapted to control an electrically operated control valve disposed within a bypass passage between distribution ports of a servo valve or between suction and discharge ports of a fluid pump. In addition, a torque sensor for detection of the driver's steering effort may be associated with the steering angle sensor 45 to set the flag $F_1$ as "1" during return movement of the steering wheel.

Having now fully set forth both structure and operation of the preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A control apparatus for a power-assisted steering system in a wheeled vehicle including an input shaft operatively connected to a steering wheel, an output shaft arranged for relative rotation with said input shaft, a hydraulic power cylinder operatively connected to said output shaft and having opposite fluid chambers subdivided by a power piston mounted therein for reciprocating movement, a servo valve arranged to be operated by relative rotation of said input and output shafts for selectively directing the flow of fluid under pressure from a source of hydraulic pressure to one of said fluid chambers of said power cylinder and permitting the flow of fluid discharged from the other of said fluid chambers into a fluid reservoir, and an electrically operated control valve arranged to control hydraulic pressure for power assist in accordance with a control current applied thereto, wherein the control apparatus comprises:

a first sensor for detecting a steering angle of said steering wheel and for producing a first output signal indicative of the steering angle;

a second sensor for detecting a travel speed of the vehicle and for producing a second output signal indicative of the vehicle travel speed;

means responsive to the first output signal from said first sensor for determining whether said steering wheel is being turned or is being returned to its neutral position from its steered position; and means responsive to the second output signal from said second sensor for controlling the value of said control current at a base current value when said steering wheel is being turned, and for controlling the value of said control current in such a manner that the hydraulic pressure for power assist is decreased as compared to the hydraulic pressure that defined by said base value when said steering wheel is returned during low speed travel of the vehicle and that the hydraulic pressure for power assist is increased as compared to the hydraulic pressure that defined by said base value when said steering wheel is returned during high speed travel of the vehicle.

2. The control apparatus according to claim 1, wherein said servo valve is provided with a hydraulic reaction mechanism which is actuated under control of said electrically operated control valve to control the hydraulic pressure for power assist.

3. The control apparatus according to claim 1, wherein said means responsive to the second output signal comprises means responsive to the first and second output signals from said first and second sensors for controlling the value of said control current in such a manner that said base value is decreased in accordance with an increase of the steering angle and that said base value is decreased in accordance with an increase of the vehicle travel speed.

4. The control apparatus according to claim 1, wherein said means responsive to the second output signal comprises means responsive to the second output signal from said second sensor for determining whether the vehicle is being accelerated or not, and means for controlling the value of said control current in such a manner that the hydraulic pressure for power assist is decreased as compared to the hydraulic pressure that defined by said base value when said steering wheel is returned to its neutral position from its steered position during acceleration of the vehicle at low speed travel.

* * * * *